Aug. 7, 1956     C. E. CARR     2,757,925
OPEN HEARTH CHARGING CONTAINER WITH END-GATE BRIDGING MEANS
Filed Aug. 1, 1951     2 Sheets-Sheet 1
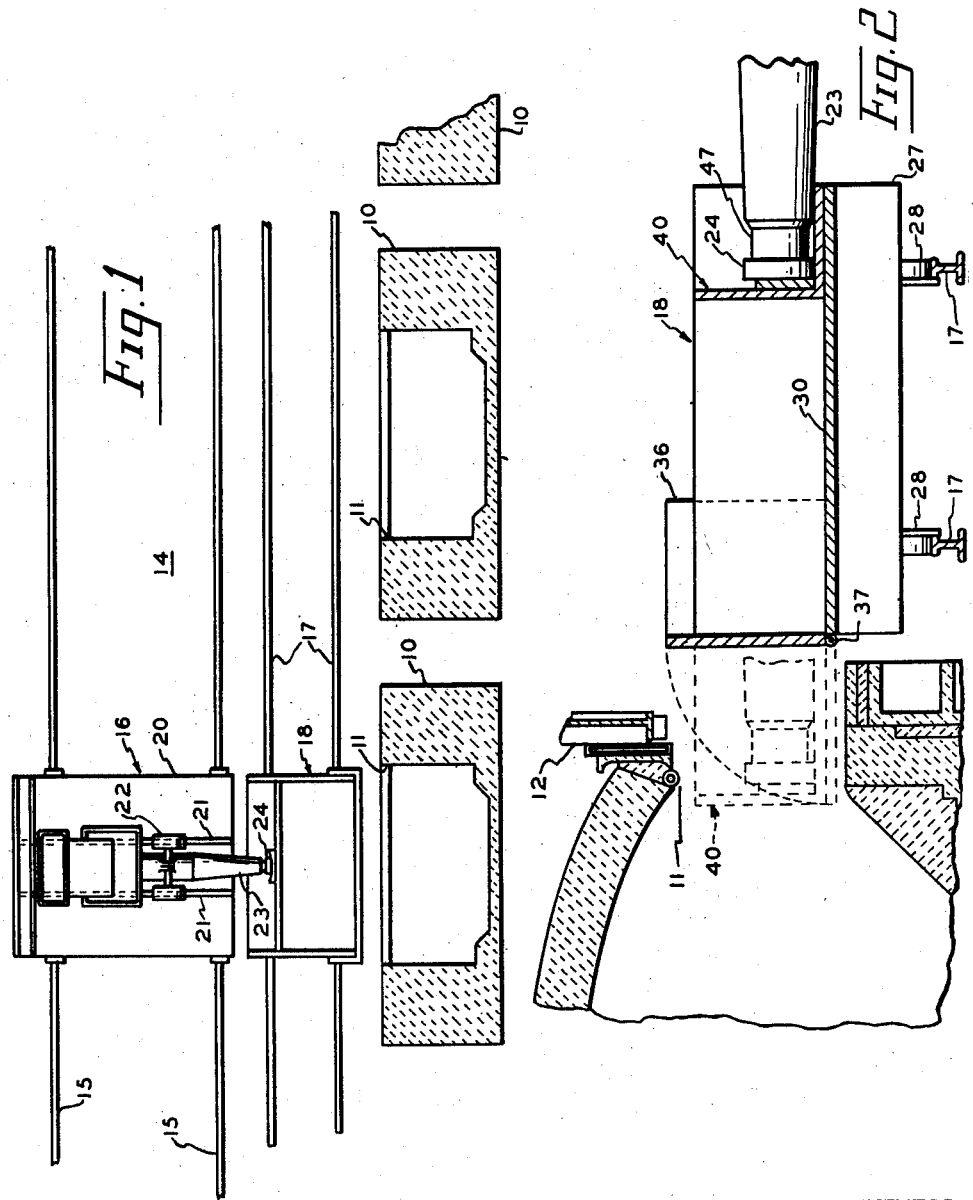
INVENTOR
CHARLES E. CARR
BY
ATTORNEY Aug. 7, 1956  C. E. CARR  2,757,925
OPEN HEARTH CHARGING CONTAINER WITH END-GATE BRIDGING MEANS
Filed Aug. 1, 1951  2 Sheets-Sheet 2

INVENTOR
CHARLES E. CARR
BY
ATTORNEY

United States Patent Office 2,757,925
Patented Aug. 7, 1956

2,757,925
OPEN HEARTH CHARGING CONTAINER WITH END-GATE BRIDGING MEANS

Charles E. Carr, Weirton, W. Va., assignor to National Steel Corporation, a corporation of Delaware Application August 1, 1951, Serial No. 239,783

3 Claims. (Cl. 266—13)

The present invention relates to an improved charging car for charging material into an open hearth furnace and relates to an improved open hearth plant including the improved charging car.

Attention is called to the copending applications assigned to the assignee of the present application. The copending applications are application, Serial No. 239,804, filed August 1, 1951, by W. H. Wright and J. M. Bendot, entitled "Charging Car and Open Hearth Plant Including Same," and application, Serial No. 239,737, filed August 1, 1951, by C. J. Klein, entitled "Charging Open Hearth Furnaces."

In open hearth plants of customary construction, there is a long series of open hearth furnaces arranged end-to-end in a line extending down the middle of the open hearth building. Each open hearth furnace has on one side a number of relatively small charging doors through which raw materials are charged into the hearth of the open hearth furnace. The floor extending along the front of the charging side of the furnace is commonly referred to as the charging floor, and the pouring floor extends along the opposite side of the line of furnaces so that the raw materials are charged into the furnace from the charging floor and the finished steel is tapped from the furnaces into ladles located on the pouring floor. On the charging floor, there is a wide gauge track spaced from, but extending parallel to, the row of open hearth furnaces. On this wide gauge track, there is mounted at least one charging machine. The charging machine includes a lower carriage or truck having flanged wheels mounted on the rails of the wide gauge track so that the charging machine is movable along this track into alignment with the furnace to be charged. A second carriage is mounted on and is movable back and forth along upper rails extending across the lower truck, and this upper charging carriage carries a peel which is tiltable upwardly and downwardly and which is also rotatable. Thus, the peel is universely movable in a horizontal plane and is tiltable upwardly and downwardly so that the outer end of the peel can be raised or lowered. Between the wide gauge track and the open hearth furnace, there is relatively narrow gauge track which extends along the row of furnaces and connects with other rails extending out into the stock yard of the plant. Charging cars or buggies, each supporting a number of small charging boxes, are mounted on these rails. The charging boxes are loaded in the yard and then the cars are moved along the rails into position adjacent the open hearth furnace which is to be charged. Each buggy supports a plurality of charging boxes and each charging box holds a small amount of material—for example, a ton of solid scrap metal. After the buggy and charging machine have been moved into place, the operator of the charging machine, while positioned at the controls of the charging machine, moves the peel outwardly so that the end of the peel engages a slot in the end of the charging box. The peel is turned to lock the end into engagement with the end of the box, and then the box is lifted and inserted through the doorway into the open hearth furnace. The box is then turned 180° to dump the charge into the furnace, after which the box is withdrawn and replaced on the buggy. This procedure is repeated many times until the open hearth furnace has been fully charged.

The iron ore, limestone and solid scrap metal are charged into the open hearth furnace in the manner described above with the scrap metal, which is usually scrap steel, constituting the largest item of solid raw material charged into the open hearth furnace. Many tons of scrap metal are charged into each open hearth furnace, and a long period of time extending over a number of hours is required to charge an open hearth furnace. This charging period is longer when relatively light-weight scrap metal is charged. The tendency today is to increase the size of the open hearth furnaces, and with these larger furnaces the charging time is much longer, so that this method of charging is similar to using a teaspoon to fill a large container.

It is an object of the present invention to provide an improved charging car for charging a large quantity of solid material into an open hearth furnace in a short period of time.

Another object of the present invention is to provide an improved charging car that can be moved into charging position adjacent the doorway of the furnace and that includes a container adapted to bridge the space between the car and the furnace and that includes a movable wall that can be moved across the container to push the charge out of the container and into the furnace.

Another object of the present invention is to provide an improved charging car that is adapted to be operated by the peel of the charging machine to quickly discharge a large quantity of material into the open hearth furnace in a short period of time.

Another object of the present invention is to provide an improved open hearth plant including an improved charging car and a charging machine, with the car and machine being arranged to quickly charge the open hearth furnace in a novel manner.

In accordance with the present invention, I provide in the open hearth plant, which includes a series of aligned open hearth furnaces and at least one charging machine movable along a track spaced from the open hearth furnace, a charging car mounted on rails between the track and the open hearth furnace so that the charging car can be quickly moved along the rails into position adjacent the furnace to be charged. The charging car carries a large container adapted to hold a large quantity of material. The container is adapted to bridge the space between the car and the furnace and has at the side away from the furnace a movable side wall structure that can be moved across the container by means of the charging machine peel to push all of the material out of the container and into the furnace in one stroke. After this large quantity of material has been charged into the furnace, the charging machine retracts the movable sidewall, and thereafter another charging car can be quickly moved along the rails in position adjacent the furnace. With this arrangement, it is possible to charge an open hearth furnace in a small fraction of the time usually required.

These and other objects and advantages of the present invention will become more readily apparent when considering the following description, taken with the accompanying drawings, in which:

Figure 1 is a fragmentary schematic view illustrating a portion of an open hearth plant embodying the principles of the present invention;

Figure 2 is an enlarged sectional view showing a charging car embodying the principles of the present invention in position adjacent an open hearth furnace.

Figure 3:
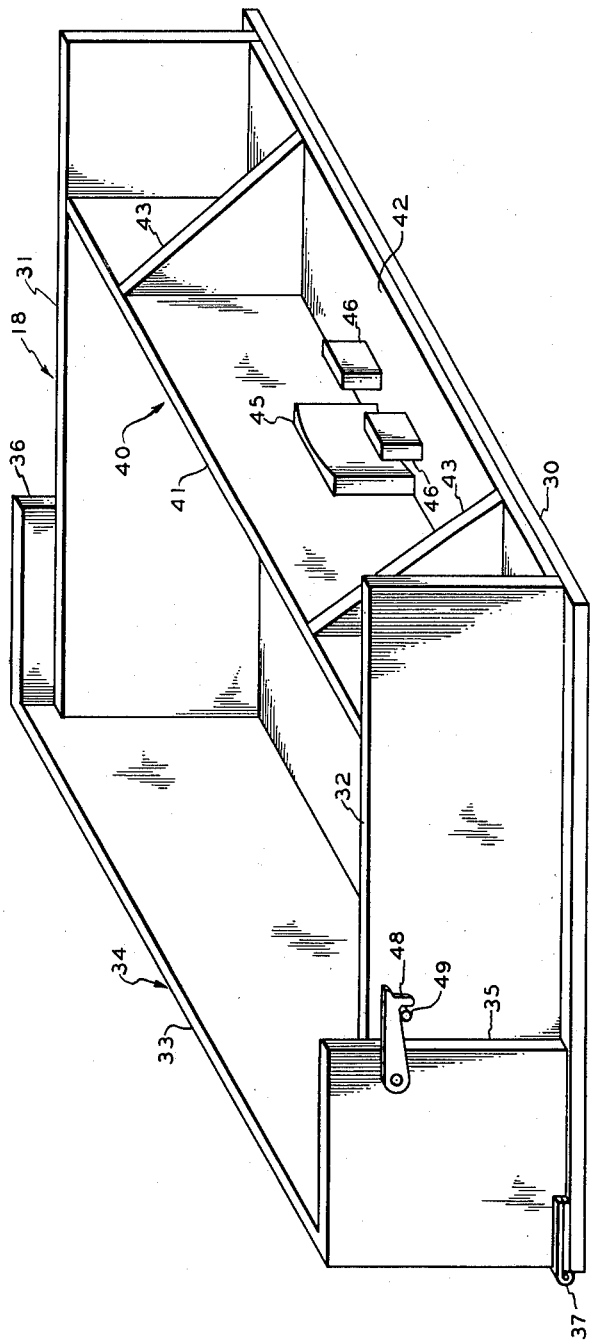
Figure 3 is an enlarged cabinet view of the container means of the charging car of Figure 2.

Referring to Figure 1 which shows the pertinent portions of an open hearth plant, the plant includes a series of open hearth furnaces 10 arranged in end-to-end relationship and extending in a line down the middle of the open hearth building, not shown, which may be of any suitable type. On one side of each furnace, there is located a charging doorway, and this doorway is normally closed by means of a door 12. The door 12 may be raised as shown in Figure 2 to open the doorway and to permit charging of the material into the furnace. Any suitable type of door may be used, and the door forms no part of the present invention. The doorways 11 of the open hearth furnaces 10 are on the side of the furnace facing the charging floor 14. On this charging floor 14, there is a wide gauge track 15 on which there is mounted at least one charging machine 16. A number of similar charging machines may be mounted on the track 15, particularly in the larger plants. On the charging floor 14 and between the furnace 10 and the track 15, there are narrow gauge rails 17 on which there is mounted a charging car 18. The rails 17 customarily connect with other rails, not shown, which extend out into the stock yard so that the charging car can be moved out into the stock yard and loaded and then moved back into the mill. Usually a number of charging cars are provided. Before the furnace is to be charged, the charging machine 16 and the charging car 18 are moved into alignment with the furnace doorway of the furnace to be charged and then, as will be more fully hereinafter described, the operator at the charging machine actuates the charging machine peel to push or charge the material carried by the charging car into the open hearth furnace.

As shown in the drawings, the charging machine 16 includes a lower wheeled truck 20 mounted on track 15. A pair of horizontal, transversely extending rails 21 are mounted on the lower truck 20, and a second carriage 22 is mounted on these upper rails 21. As the truck 20 is movable along rails 15 and carriage 22 is movable along rails 21, the peel 23 is universally movable in a horizontal plane. In addition, the peel is suspended on the carriage 22 so that the peel can be tilted to raise or lower the outer end 24. These charging machines are widely used in steel mills and are well known to those skilled in the art. The charging machine may be of any suitable type as long as it includes a peel or its equivalent movable in the manner described and in the manner that is necessary to operate the charging car as will become apparent from the following description.

The charging car 18 includes a supporting frame or carriage 27 having flanged wheels 28 mounted on rails 17 for movement therealong. The frame 27 supports the container 18 which is adapted to bridge the space between the car and the furnace 10. The container 18 includes a bottom wall or plate 30 and spaced apart, upwardly extending end walls 31 and 32. At the side of the container toward the open hearth furnace, there is a side wall 34 which also constitutes a bridging means. The sidewall 34 includes wall 33 and end walls 35 and 36. The sidewall structure 34 is hinged at 37 to the bottom wall 30 so that the wall 34 can be swung down into bridging position as shown in broken lines on Figure 2. When the sidewall structure 34 is in the bridging position, the wall 33 serves as an extension of the container bottom wall 30, and the walls 35 and 36 extend upwardly to form continuations of the end walls 32 and 31, respectively, to prevent the scrap material from falling off the ends of the sidewall when the material is pushed into the open hearth furnace.

At the side of the container toward the charging machine 16 and away from the open hearth furnace, there is a movable sidewall structure 40. The sidewall structure 40 includes an upwardly extending wall or plate 41 and an outwardly extending horizontal wall or plate 42.

The plates 41 and 42 are connected together by any suitable means to provide in cross-section an L-shape. The plates 41 and 42 may be reinforced by plates 43. The side wall structure 40 is slidable across the container from the normal or retracted position, shown in full lines in the drawings, to the charging position, shown in broken lines in Figure 2. On the sidewall structure 40, there is an abutment plate 45 positioned substantially midway of the ends of the sidewall. A pair of spaced members 46 extend upwardly from the wall 42, and the members 46 are spaced from plate 45 so that the outer end or head 24 of peel 23 can fit between members 46 and 45. The members 46 also are spaced to receive therebetween the reduced neck 47 that is just back of the peel head 23. Thus, the operator can move the peel outwardly toward the charging car 18 and then lower the outer end of the peel between members 45 and 46 to engage the head of the peel 24 with the movable sidewall structure 40 so that the members 45 and 46 constitute means for engaging the head of the peel. With the head 24 of the peel engaging the movable sidewall structure, the movable sidewall structure is movable toward and away from the furnace upon movement of the peel.

As shown and described, the movable sidewall structure is adapted to slide across the container bottom wall 30 between the end walls 31 and 32 to push the charge into the furnace. It is to be understood that other means may be provided for movably supporting the movable sidewall structure.

In operation, the charging machine 16 and the charging car 18 are moved into position in alignment with the furnace 10 which is to be charged as shown in Figure 1. Then the operator, while stationed at the customary set of controls on the charging machine, moves the head 24 of the peel into engagement with the peel engaging means on the movable sidewall 40. After the door or doors 12 have been raised to uncover the doorway 11, the bridging sidewall 34 is swung down into position to bridge the space between the furnace and the car, and then the movable sidewall 40 is moved across the car to push the charge into the furnace. The operator then retracts the peel to move the movable sidewall back to its normal position, and after the peel has been released from the movable sidewall and the swingable sidewall 34 has been swung back to its normal position, the car 18 is moved along the track 17 out of the way, and, if necessary, another car is then moved into position adjacent the furnace and the operation is repeated.

In order to prevent accidental movement of the movable sidewall 34 about the hinge 37, a latch member 48 is mounted on the end wall 35 and is adapted to engage a pin 49 on wall 32 to hold the movable sidewall structure 34 in its normal position. The latch 48 can be readily released to permit swinging the sidewall structure down into the bridging position.

The present car may hold, for example, 15 to 20 tons of scrap metal so that the furnace can be charged in a small fraction of the time usually required with the customary containers which hold, for example, only about a ton or less of scrap metal.

I claim:

1. In an open hearth furnace plant comprising an open hearth furnace having a single charging opening in the front wall of the furnace communicating with the interior of the furnace, the charging opening having a bottom sill including inside and outside edges extending lengthwise of the furnace throughout a major portion of the interior length of the furnace, and car rails spaced from the front wall of the furnace and extending in parallel relation therewith, a charging car adapted to be mounted on the car rails for movement alone the car rails into a position in front of the charging opening, the charging car including container means for holding a charge of material, the container means including a bottom wall having a length dimension slightly less than the length of the charging opening and rigid upstanding end walls spaced from each other a distance slightly less than the length of the charging opening, means for mounting the container means on the charging car with the front side edge of the bottom wall in spaced relation with respect to the charging opening, bridging means carried by the container means, means for mounting the bridging means for movement into a bridging position to form an extension of the bottom wall and end walls of the container means to bridge the space between the front side edge of the container means and the charging opening, the bridging means including a bottom portion of a length less than the length of the charging opening and greater than the length of the container means and extending longitudinally of the container means and terminating outwardly of the end walls of the container means, side portions joined to the terminating ends of the bottom portion and extending outside the end walls of the container means, the transverse dimension of the bottom portion of the bridging means being greater than the distance between the front side edge of the container means and the inside edge of the bottom sill so that the bottom portion extends into the charging opening in overlying relation with the bottom sill and terminates within the furnace inwardly of the bottom sill upon the bridging means being moved into bridging position, a movable material advancing structure at the other end of the container means extending substantially throughout the length of the container means, means for mounting the movable material advancing structure for transverse sliding movement relative to the bottom wall and the rigid end walls of the container means in a direction toward the charging opening throughout the width of the container means and substantially throughout the width of the bridging means when in bridging position, and means for slidably moving the movable material advancing structure.

2. In an open hearth furnace plant comprising an open hearth furnace having a single charging opening in the front wall of the furnace communicating with the interior of the furnace, the charging opening having a bottom sill including inside and outside edges extending lengthwise of the furnace throughout a major portion of the interior length of the furnace, and car rails spaced from the front wall of the furnace and extending in parallel relation therewith, a charging car adapted to be mounted on the car rails for movement along the car rails into a position in front of the charging opening, the charging car including container means for holding a charge of material, the container means including a bottom wall having a length dimension slightly less than the length of the charging opening and rigid upstanding end walls spaced from each other a distance slightly less than the length of the charging opening, means for mounting the container means on the charging car with the front side edge of the bottom wall in spaced relation with respect to the charging opening, a first side wall structure pivotally mounted on the side of the container means adjacent the charging opening for swinging movement about an axis extending longitudinally of the container means in the region of the front side edge of the bottom wall of the container means, the first side wall structure including a wall portion extending longitudinally of the container means and side portions joined to the terminating ends of the wall portion outside the end walls of the container means, the first wall structure being movable to a material confining position in which the wall portion extends upwardly into material confining engagement with the end walls of the container means and being movable to a bridging position in which the wall portion extends outwardly from the front edge of the bottom wall of the container means and forms a continuation of the bottom wall of the container means and in which the side portions form a continuation of the end walls of the container means, the transverse dimension of the wall portion of the first side wall structure being greater than the distance between the front side edge of the container means and the inside edge of the bottom sill so that the wall portion extends in to the charging opening in overlying relation with the bottom sill and terminates within the furnace inwardly of the bottom sill upon the first side wall structure being moved to the bridging position, means for releasably holding the first side wall structure in the material confining position, a second side wall structure at the other side of the container means, means for mounting the second side wall structure for transverse sliding movement relative to the bottom wall and the rigid end walls of the container means in a direction toward the charging opening throughout the width of the container means and substantially throughout the width of the wall portion of the first side wall portion when in bridging position, and means for slidably moving the second side wall structure.

3. In an open hearth furnace plant comprising an open hearth furnace having a single charging opening in the front wall of the furnace communicating with the interior of the furnace, the charging opening having a bottom sill including inside and outside edges extending lengthwise of the furnace throughout a major portion of the interior length of the furnace, car rails spaced from the front wall of the furnace and extending in parallel relation therewith and a charging machine including a movable peel mounted adjacent the side of the car rails opposite the charging opening, a charging car adapted to be mounted on the car rails for movement along the car rails into a position in front of the charging opening, the charging car including container means for holding a charge of material, the container means including a bottom wall having a length dimension slightly less than the length of the charging opening and rigid upstanding end walls spaced from each other a distance slightly less than the length of the charging opening, means for mounting the container means on the charging car with the front side edge of the bottom portion in spaced relation with respect to the charging opening, bridging means carried by the container means, means for mounting the bridging means for movement into a bridging position to form an extension of the bottom wall and end walls of the container means to bridge the space between the front side edge of the container means and the charging opening, the bridging means including a bottom portion of a length less than the length of the charging opening and greater than the length of the container means and extending longitudinally of the container means and terminating outwardly of the end walls of the container means, side portions joined to the terminating ends of the bottom portion and extending outside the end walls of the container means, the transverse dimensions of the bottom portion and the side portions of the bridging means being greater than the distance between the front side edge of the container means and the inside edge of the bottom sill so that the bottom portion and the side portions extend into the charging opening in overlying relation with the bottom sill and terminates within the furnace inwardly of the bottom sill upon the bridging means being moved into bridging position, a movable side wall structure at the other side of the container means, means for mounting the movable side wall structure for transverse sliding movement relative to the bottom wall and the rigid end walls of the container means in a direction toward the charging opening throughout the width of the container means and substantially throughout the width of the bridging means when in bridging position, and means carried by the movable side wall structure adapted to receive the peel of the charging machine for slidably moving the movable side wall structure responsively to operation of the peel.

(References on following page)

References Cited in the file of this patent

UNITED STATES PATENTS

| | | |
|---|---|---|
| 747,172 | Haug | Dec. 15, 1903 |
| 2,405,342 | Brosius | Aug. 6, 1946 |
| 2,551,278 | Millan | May 1, 1951 |

FOREIGN PATENTS

| | | |
|---|---|---|
| 113,027 | Germany | Aug. 20, 1900 |

OTHER REFERENCES

"The Making, Shaping and Treating of Steel," fifth edition (1940), by Camp and Francis, pages 392, 393 and 394 are relied on. Published by the Carnegie Illinois Steel Corp., Pittsburgh, Pa.

"Basic Open Hearth Steel Making," first edition (1944), published by the American Institute of Mining and Metallurgical Engineers, New York, N. Y. Pages 32 and 33 are relied on.